US00RE39473E

(19) United States
(12) Reissued Patent
Salo et al.

(10) Patent Number: US RE39,473 E
(45) Date of Reissued Patent: Jan. 23, 2007

(54) UPRIGHT VACUUM CLEANER WITH CYCLONIC AIRFLOW PATHWAY

(75) Inventors: Robert A. Salo, Mentor, OH (US); Charles J. Thur, Broadview Heights, OH (US); Paul D. Stephens, Twinsburg, OH (US); Mark E. Cipolla, Chardon, OH (US); Michael F. Wright, Stow, OH (US)

(73) Assignee: Royal Appliance Mfg. Co., Glenwillow, OH (US)

(21) Appl. No.: 10/752,485
(22) Filed: Jan. 6, 2004

Related U.S. Patent Documents

Reissue of:
(64) Patent No.: 6,341,404
Issued: Jan. 29, 2002
Appl. No.: 09/483,014
Filed: Jan. 13, 2000

(51) Int. Cl.
*A47L 9/16* (2006.01)

(52) U.S. Cl. ..... 15/353; 15/350; 15/352; 55/DIG. 3; 55/337

(58) Field of Classification Search ..... 15/352, 15/353, 350; 55/DIG. 3, 337, 492, 498, 482, 55/505, 507, 429
See application file for complete search history.

(56) References Cited

U.S. PATENT DOCUMENTS 3,484,890 A * 12/1969 Case
4,172,710 A * 10/1979 van der Molen
4,373,228 A * 2/1983 Dyson
4,826,515 A * 5/1989 Dyson ..... 55/429
4,944,780 A * 7/1990 Usmani
5,145,499 A * 9/1992 Dyson ..... 15/352
5,160,356 A * 11/1992 Dyson ..... 55/429
5,230,722 A * 7/1993 Yonkers
5,267,371 A * 12/1993 Soler et al.
5,593,479 A * 1/1997 Frey et al.
5,867,863 A * 2/1999 McCormick
5,922,093 A * 7/1999 James et al.
5,946,771 A * 9/1999 Bosyj et al.
5,961,677 A * 10/1999 Scott
6,003,196 A * 12/1999 Wright et al.
6,070,291 A * 6/2000 Bair et al.
6,168,641 B1 * 1/2001 Tuvin et al.
6,192,550 B1 * 2/2001 Hamada et al. ..... 15/352
2003/0182757 A1 10/2003 Sepke

FOREIGN PATENT DOCUMENTS

EP 0 557 096 A1 * 8/1993
EP 0 928 594 A1 * 7/1999
WO WO 94/00046 * 1/1994

* cited by examiner

*Primary Examiner*—Theresa T. Snider
(74) *Attorney, Agent, or Firm*—Fay, Sharpe, Fagan, Minnich & McKee, LLP

(57) ABSTRACT

An upright vacuum cleaner includes an upright housing section and a nozzle base section. A cyclonic airflow dirt and dust separating chamber is defined in the upright housing section. A suction source pulls air and entrained dirt, dust, and other contaminants through a main suction opening formed in the underside of the nozzle base section and into the cyclonic airflow chamber. The cyclonic airflow chamber causes the suction airstream to travel in a cyclonic path such that the entrained contaminants are separated therefrom and deposited into a dirt container that defines the chamber. A main filter element filters residual contaminants from the suction airstream between the chamber and the suction source. An exhaust filter housing includes an airstream suction duct in fluid communication with an outlet of the airflow chamber and an inlet of the suction source. An outlet of the suction source is in fluid communication with an exhaust plenum of the exhaust filter housing. An exhaust filter is positioned radially outward of the exhaust plenum such that exhaust air is forcedly radially outward through the exhaust filter from the exhaust plenum to ensure that the air discharged into the atmosphere is contaminant free, including those contaminants introduced into the airstream by the suction source itself.

72 Claims, 6 Drawing Sheets

UPRIGHT VACUUM CLEANER WITH CYCLONIC AIRFLOW PATHWAY

Matter enclosed in heavy brackets [ ] appears in the original patent but forms no part of this reissue specification; matter printed in italics indicates the additions made by reissue.

BACKGROUND OF THE INVENTION

The present invention relates to the vacuum cleaner arts. More particularly, the present invention relates to upright vacuum cleaners that are used for suctioning dirt and debris from carpets and floors.

Upright vacuum cleaners are well known in the art. Two types of upright vacuum cleaners are a soft bag-type vacuum cleaner and a hard shell-type vacuum cleaner. In a conventional soft bag-type vacuum cleaner, a vacuum source generates the suction required to pull dirt from the carpet or floor being vacuumed through a suction opening, through a motor/fan housing, and into a filter bag housed within a soft bag secured to a handle portion of the vacuum cleaner. The cleaned air is then exhausted through the porous walls of the filter bag and soft bag. In a conventional hard shell-type vacuum cleaner, a vacuum source generates the suction required to pull dirt from the carpet or floor being vacuumed through a suction opening and into a filter bag housed within a hard shell upper portion of the vacuum cleaner. Cleaned air travels through the porous walls of the filter bag, through the motor/fan housing, and is then exhausted to the atmosphere.

To avoid the need for vacuum filter bags altogether, and the associated expense and inconvenience of replacing filter bags, a third type of upright vacuum cleaner utilizes cyclonic airflow, rather than a filter bag, to separate the majority of the dirt and other particulates from the suction air stream. After separating debris from the air stream, the air is typically filtered to remove any residual particulates. The filtered air then travels through the motor/fan housing and is exhausted.

For many of the known cyclonic airflow-type vacuum cleaners, the process of emptying a dirt collection container is inconvenient and often results in the spillage of the container contents. Further, in some cyclonic airflow-type vacuum cleaners, the exhaust air is not sufficiently free of residual contaminants. Because the cyclonic action of such conventional cyclonic airflow-type vacuum cleaners does not completely remove all dust, dirt and other contaminants from the suction air stream, it is necessary to include an exhaust filter downstream from the motor. As a result, some cyclonic airflow-type vacuum cleaners incorporate a final filter stage such as a substantially rectangular or cartridge-type exhaust filter positioned on one side of the vacuum cleaner upright housing section. Such cyclonic airflow-type vacuum cleaners incorporating cartridge-type exhaust filters tend to have profiles that are bulky and less maneuverable for the user.

Accordingly, it has been deemed desirable to develop a new and improved upright vacuum cleaner having an optimized airflow pathway that overcomes the foregoing difficulties and others while providing better and more advantageous overall results.

SUMMARY OF THE INVENTION

According to the present invention, a new and improved upright vacuum cleaner is provided.

In accordance with the first aspect of this invention, a vacuum cleaner includes a cyclonic airflow chamber that facilitates the separation of contaminants from a suction airstream. The airflow chamber includes a chamber inlet and a chamber outlet. The chamber inlet is fluidically connected with a nozzle base suction opening. An exhaust filter housing includes a suction airstream duct and an exhaust airstream plenum. The suction airstream duct communicate s with the chamber outlet. An airstream suction source includes a suction inlet and a suction outlet. The suction inlet communicates with the suction airstream duct, and the suction outlet communicates with the exhaust airstream plenum. A primary filter assembly is positioned between the cyclonic airflow chamber and the suction source for filtering contaminants from the suction airstream.

In accordance with another aspect of this invention, an upright vacuum cleaner includes an upright housing section including a handle, and a nozzle base section hingedly interconnected with the upright housing section. The nozzle base section includes a main suction opening formed in an underside thereof. A cyclonic airflow chamber is defined in the upright housing section for separating dust and dirt from a suction airstream. The cyclonic airflow chamber includes an chamber inlet and a chamber outlet. A suction source is located in one of the upright housing section and the nozzle base section and has a suction airflow inlet and an exhaust airflow outlet. The suction airflow inlet is positioned remote from the chamber outlet. An exhaust filter housing is positioned below the cyclonic airflow chamber and includes a suction airstream duct in fluid communication with the chamber outlet and the suction airflow inlet. A main filter assembly is located between the cyclonic airflow chamber and the suction source for filtering residual dust and dirt from a suction airstream as it flows through the cyclonic airflow dust and dirt separating chamber.

In accordance with yet another aspect of this invention, an upright vacuum cleaner includes a separation chamber that facilitates the separation of debris from a suction airstream; an exhaust filter housing including an exhaust filter; a suction source housing including a suction source, wherein the separation chamber, the exhaust filter housing, and the suction source housing cooperate to define an airflow pathway that i) extends axially downward from the separation chamber through the exhaust filter housing and into the suction source housing, ii) extends laterally across the suction source, iii) extends axially upward from the suction source housing into the exhaust filter housing, and iv) extends radially outward through the exhaust filter.

One advantage of the present invention is the provision of a new and improved vacuum cleaner.

Another advantage of the invention is found in the provision of the vacuum cleaner with a cyclonic airflow chamber through which the suction airstream flows for separating dust and dirt from the airstream and for depositing the separated dust and dirt into an easily and conveniently emptied dirt cup.

Still another advantage of the present invention resides in the provision of a cyclonic airflow upright vacuum cleaner with a main filter that effectively filters residual contaminants from the suction airstream between the cyclonic airflow chamber an the motor assembly without unduly restricting airflow and without premature clogging.

Yet another advantage of the present invention is the provision of a cyclonic airflow upright vacuum cleaner in which a direct air path is provided between an airflow outlet from a main filter chamber and a vacuum source. Preferably, the vacuum source is positioned beneath the suction airflow outlet.

Still yet another advantage of the present invention is the provision of an upright vacuum cleaner with an approximately annular exhaust filter located downstream from the suction motor assembly for filtering the exhaust airstream immediately prior to its exhaustion into the atmosphere.

A further advantage of the present invention is the provision of a vacuum cleaner with a radial dirty air inlet into a dust separation chamber and an axial cleaner air outlet from the dust separation chamber, wherein the outlet is separated from the inlet by a filter. Preferably, the dirty air inlet is located at an upper end of the dust separation chamber and includes a diverter for directing the inlet air along a tangential course within the chamber.

A yet further advantage of the present invention is the provision of a vacuum cleaner with a main filtration chamber positioned directly above an exhaust filter housing wherein the suction airstream flows axially downward to a motor/fan housing through a central duct extending through the exhaust filter housing, and flows from the motor/fan housing axially upward back into the exhaust filter housing before flowing radially outward through an annular exhaust filter.

A yet further advantage of the present invention is the provision of a vacuum cleaner with a main filtration chamber defined by a removable dirt cup and a removable lid secured to the dirt cup, the dirt cup housing a removable main filter element.

Still other benefits and advantages of the invention will become apparent to those of average skill in the art upon a reading and understanding of the following detailed description.

BRIEF DESCRIPTION OF THE DRAWINGS

The invention may take form in certain components and structures, a preferred embodiment of which will be illustrated in the accompanying drawings wherein.

DETAILED DESCRIPTION OF THE PREFERRED EMBODIMENT

Figure 1:
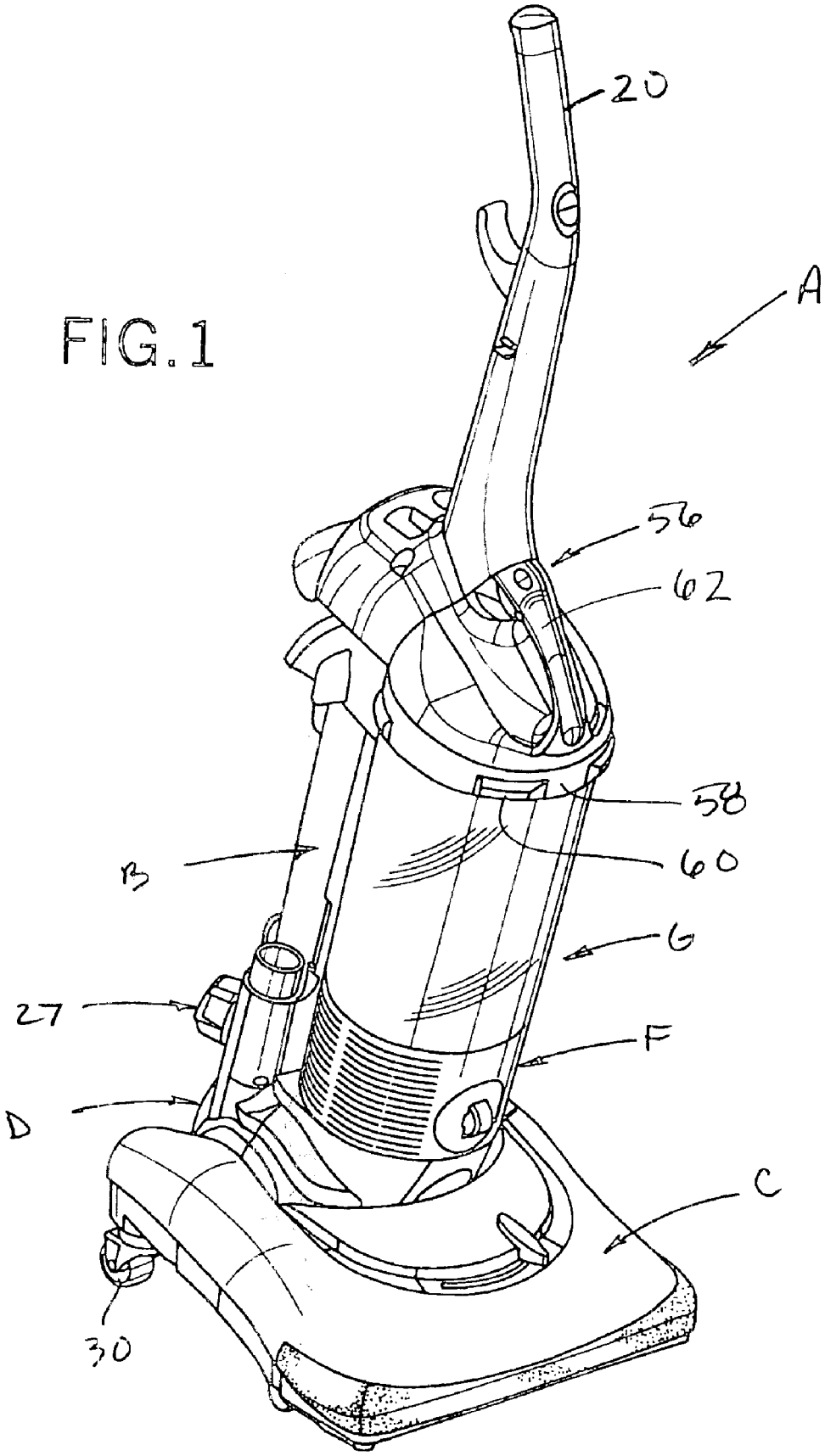
FIG. 1 is a perspective view illustrating a cyclonic airflow-type upright vacuum cleaner in accordance with the present invention.

Referring now to the FIGURES, wherein the showings are for purposes of illustrating preferred embodiments of the invention only and not for purposes of limiting the same, FIG. 1 illustrates a cyclonic airflow-type vacuum cleaner A including an upright housing section B and a nozzle base section C. The sections B, C are pivotally or hingedly connected through the use of trunnions or another suitable hinge assembly D so that the upright housing section B pivots between a generally vertical storage position (as shown) and an inclined use position. Both the upright and nozzle sections B, C are preferably made from conventional materials such as molded plastics and the like. The upright section B includes a handle 20 extending upward therefrom by which an operator of the vacuum A is able to grasp and maneuver the vacuum.

Figure 6:
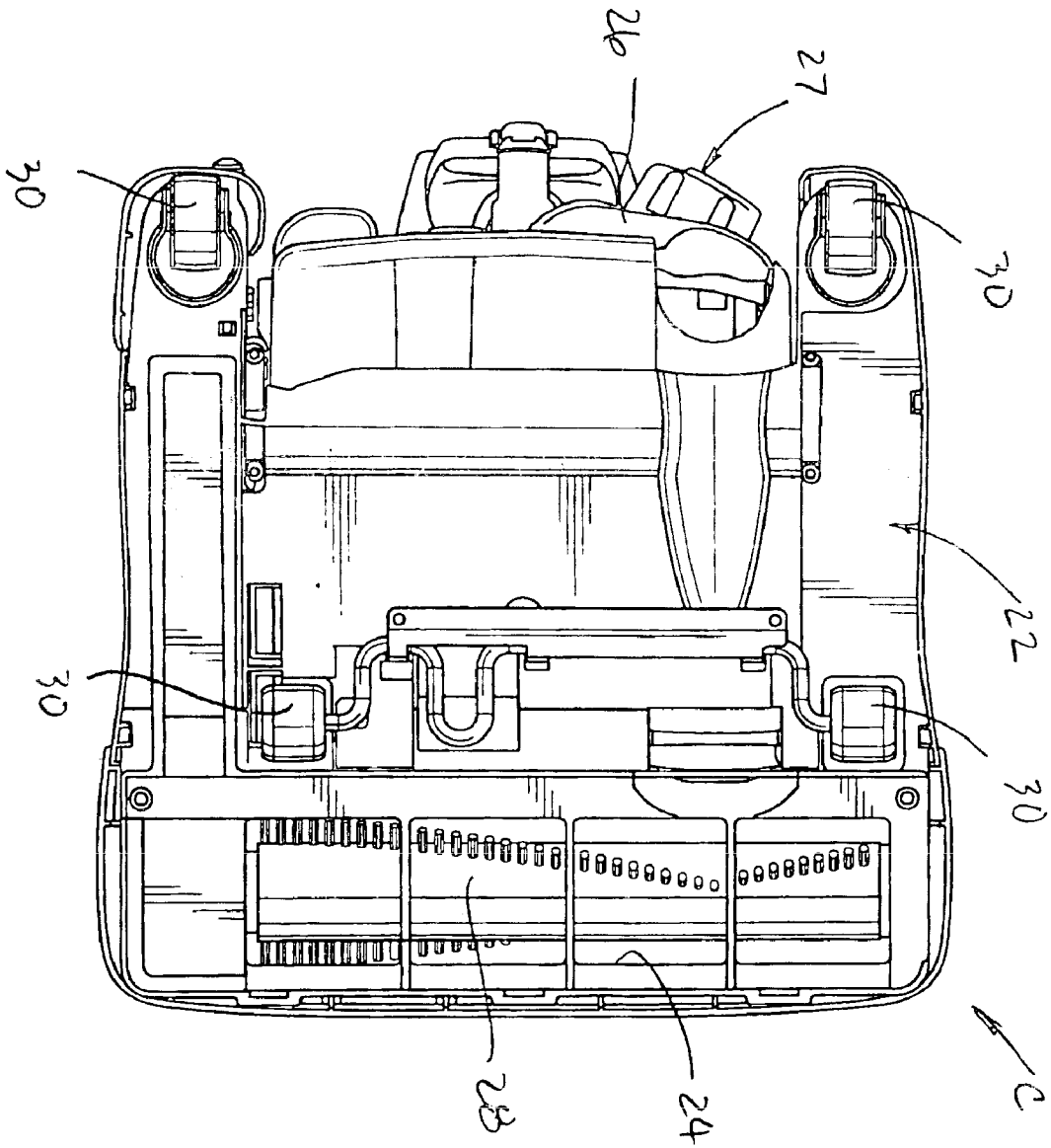
FIG. 6 is a bottom plan view of a nozzle base section of the vacuum cleaner illustrated in FIG. 1.

During vacuuming operations, the nozzle base C travels across the floor, carpet, or other subjectant surface being cleaned. With reference to FIG. 6, an underside 22 of the nozzle base includes a main suction opening 24 formed therein which extends substantially across the width of the nozzle at the front end thereof. As is known, the main suction opening 24 is in fluid communication with the vacuum upright housing section B through a connector hose assembly 26 and a diverter valve assembly 27. The diverter valve assembly 27 permits suction airflow to be drawn from either the nozzle base section C or from a conventional above-the-floor cleaning assembly, such as an extendable hose (not shown) connected to the diverter valve assembly and/or removable suction nozzle attachments (e.g. a wand, etc.). A rotating brush assembly 28 is positioned in the region of the nozzle main suction opening 24 for contacting and scrubbing the surface being vacuumed to loosen embedded dirt and dust. A plurality of wheels or casters 30 support the nozzle on the surface being cleaned and facilitate its movement thereacross.

Figure 3:
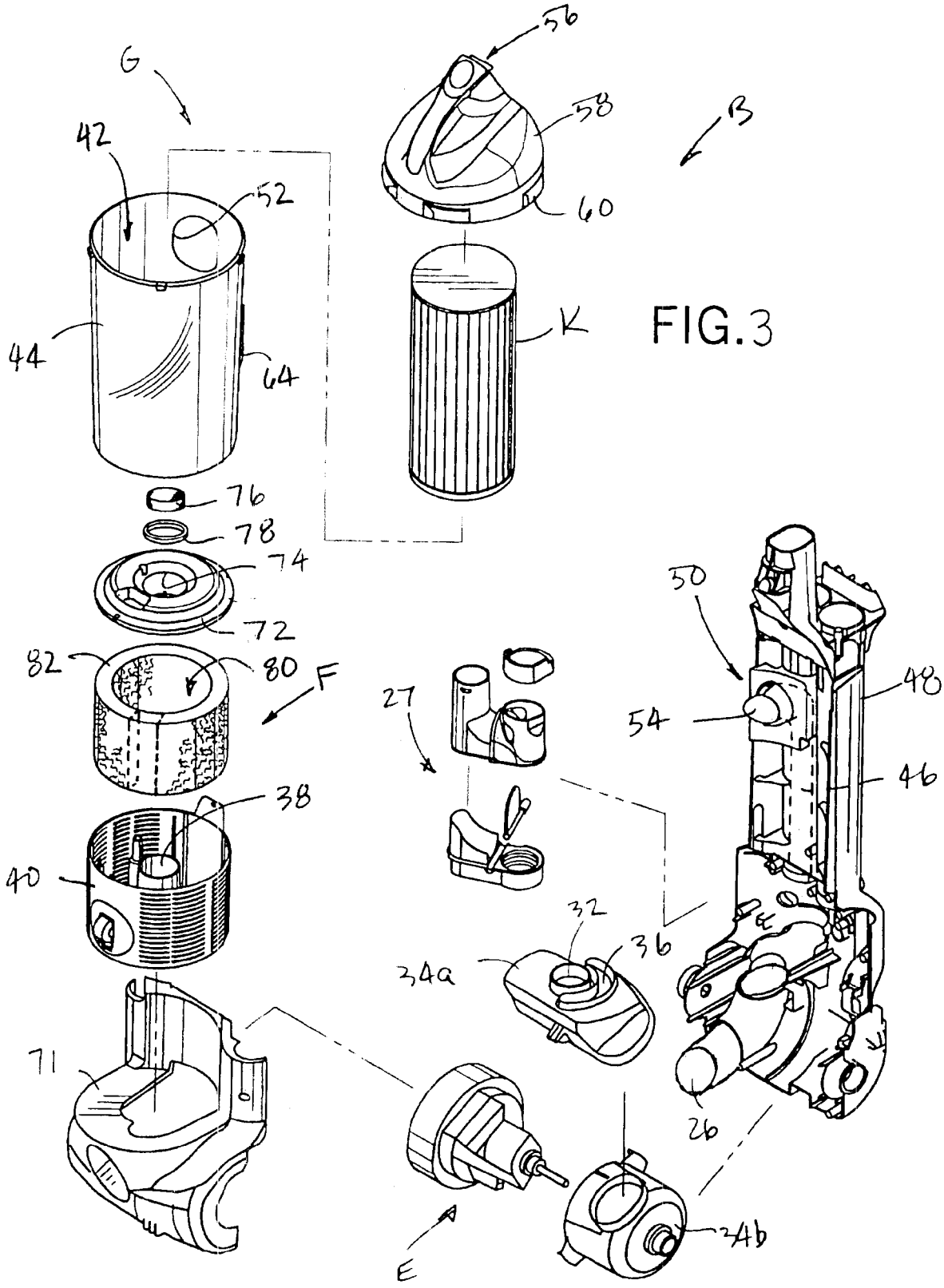
FIG. 3 is an exploded perspective view illustrating an upright housing section of the vacuum cleaner of FIGS. 1 and 2.

The upright vacuum cleaner A includes a vacuum or suction source for generating the required suction airflow for cleaning operations. With reference now to FIG. 3, a suitable suction source, such as an electric motor and fan assembly E, generates a suction force in a suction inlet 32 of a two-piece motor/fan housing 34a, 34b, and generates an exhaust force in an exhaust outlet 36 of the motor/fan housing 34a, 34b. In effect, the suction airstream flows in a loop through the motor/fan housing. More particularly, the suction airstream enters the suction inlet 32 of the motor/fan housing and then flows laterally across a suction inlet duct 33. The airstream is then drawn downward through a fan inlet duct 35 and forced (i.e. drawn and then exhausted) laterally across the motor/fan assembly E before flowing upward through an exhaust outlet duct 37 and through the arcuate, semi-circular or crescent-shaped exhaust outlet 36.

The motor/fan assembly airflow exhaust outlet 36 is in fluid communication with a final filter assembly F for filtering the exhaust airstream of any contaminants which may have been picked up in the motor/fan assembly E immediately prior to its discharge into the atmosphere. The motor/fan assembly suction inlet 32, on the other hand, is in fluid communication with a cyclonic suction airflow dust and dirt separating stage G via a central suction duct 38 of an annular, final filter assembly housing 40, to generate a suction force in the dust and dirt separating stage G.

The cyclonic suction airflow dust and dirt separating stage G, housed in the upright section B, includes a cyclonic airflow chamber 42 defined by a dirt cup, container, or housing 44 which is pivotally and releasably connected to the upright housing section B. A suction airstream from the nozzle base section C passes through a suction duct 46 of a rear panel 48 and enters an upper portion of the cyclonic dust and dirt separation chamber 42 through a generally radial suction airstream inlet 50. The inlet 50 includes an aperture 52 through the container sidewall 44, and a diverter 54 that is attached to the rear panel 48 and passes through the aperture 52 when the container 44 is secured to the upright housing section B.

Figure 5:
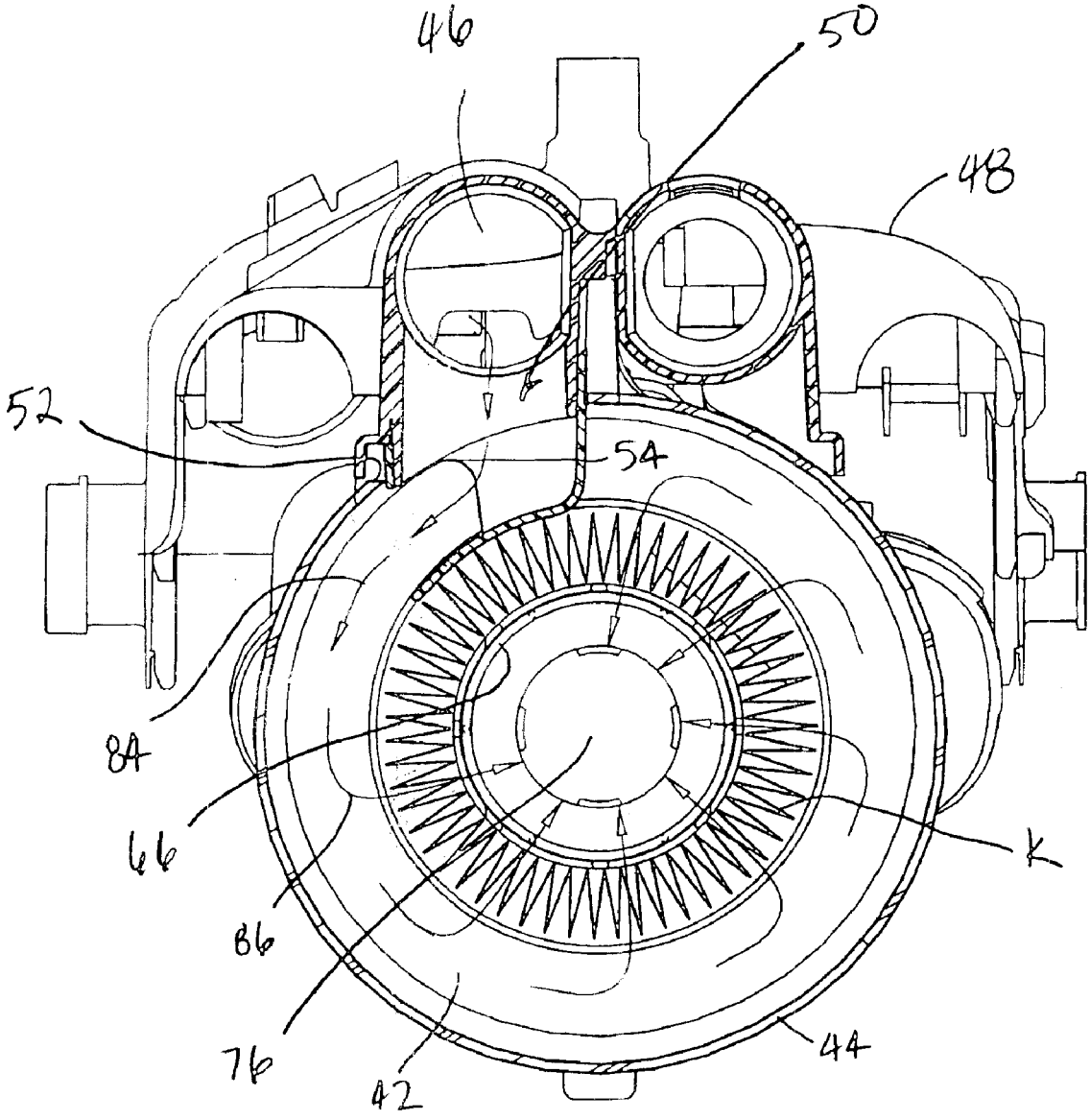
FIG. 5 is a cross section view of the cyclonic airflow dust and dirt separating chamber taken along the line 5—5 of FIG. 2.

As best shown in FIG. 5, the diverter 54 directs the generally radial suction airstream tangentially in the container 44, thus causing a cyclonic airflow within the container. It should be appreciated that the generally radial suction stream inlet 50 of the present invention reduces the width and depth profile of the upright housing section B relative to known generally tangential suction airstream inlets. That is, the location of the inlet 50, the outlet 70, and the generally cylindrical configuration of the cyclonic airflow chamber 42 causes the suction airstream to follow a swirling or cyclonic path downward within the chamber 42. The air flows radially inward through a generally tubular or toroidally-shaped primary or main filter K, and then downwardly through the hollow center of the filter. The orientation of the inlet diverter 54 affects the direction of cyclonic airflow, and the invention is not meant to be limited to a particular direction, i.e. clockwise or counterclockwise.

Figure 2:
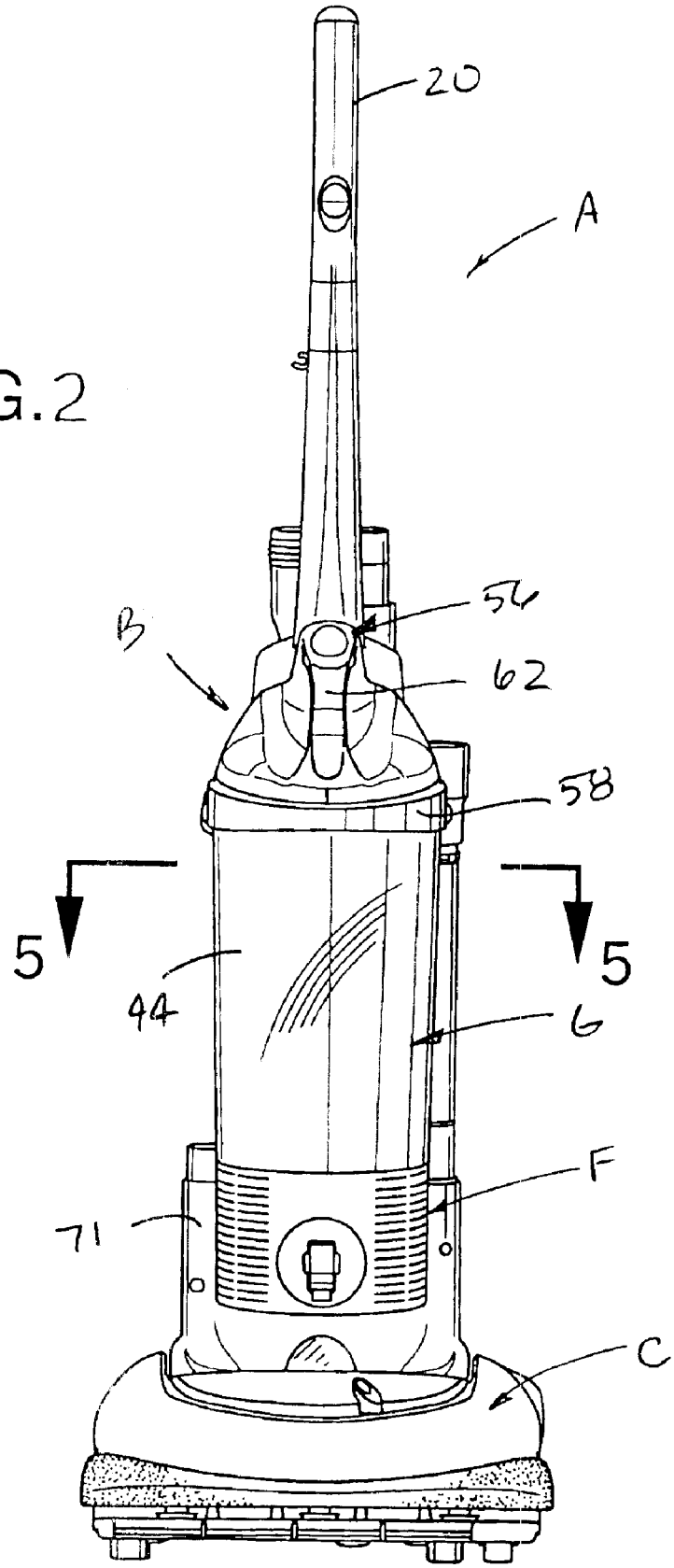
FIG. 2 is a front elevation view of the vacuum cleaner illustrated in FIG. 1.

With reference now to FIG. 2, the dirt container 44 is secured to the vacuum cleaner upright section B through a latch assembly 56 which, when actuated, releases the dirt container 44 from an operative upright position. The latch assembly 56 is associated with a cover or lid 58 that is removably secured to the container 44 via a bayonet-type locking arrangement 60 (FIG. 1). A handle 62 is provided on an upper portion of the lid 58 to facilitate operator movement of the container between the operative, upright position, and a removed position. The latch 56 retains the dirt container in the operative upright and secured position. As is well known, the latch 56 can be biased through the use of a spring or other resilient member or via the natural resiliency of the plastic from which it is molded.

Figure 4:
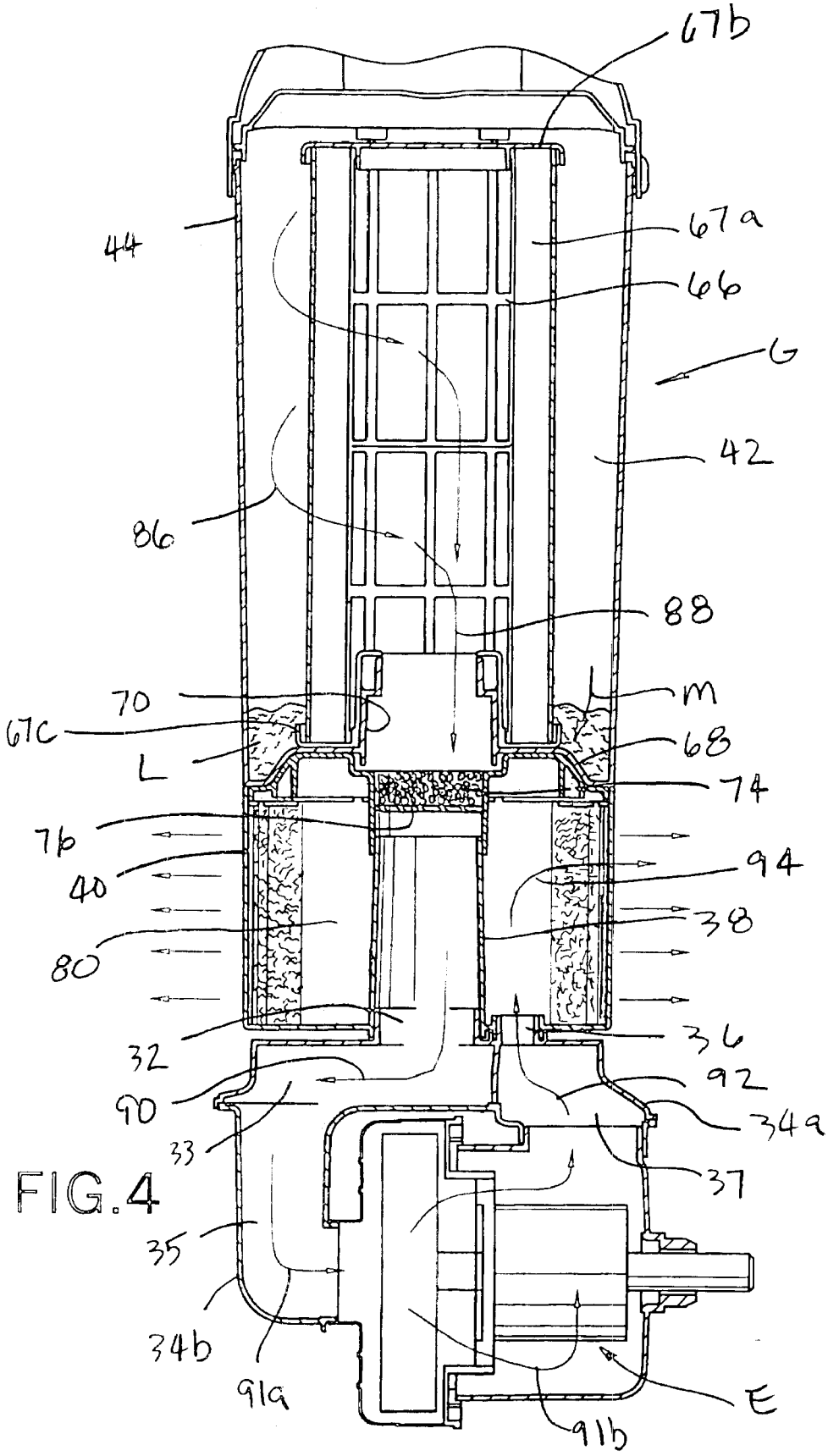
FIG. 4 is an enlarged front elevation view in cross section of the upright housing section of the vacuum cleaner illustrated in FIG. 2 showing an airflow pathway through a cyclonic airflow dust and dirt separating chamber, a motor/fan housing, and an exhaust filter housing.

The dirt container 44 includes an integral handle 64 (FIG. 3) for use in holding the container with the lid 58 is removed so as to empty the dust chamber 42 from an open upper end of the container 44. With reference now to FIG. 4, the dirt container 44 also includes a main filter support in the form of a cage or like structure 66 extending upwardly from a floor or base thereof. The cage 66 is positioned in a central region of the cyclonic airflow chamber 42. The main filter element K is positioned over the cage 66.

The filter element K is engaged in an interface fit with the cage 66 so that the filter is releasably yet securely retained in its operative position, even when the dirt cup 44 is removed from the vacuum cleaner and inverted, with the id 58 removed, for purposes of emptying the contents thereof. Thus, over the entire height of the dirt cup 44, an annular cyclonic airflow passage is defined between the main filter K and the dirty cup 44.

In the embodiment being described the main filter element K includes a pleated filter medium 67a generally taken in the form of a hollow right cylinder. The main filter element K also includes an annular upper tray 67b and an annular lower tray 67c positioned (e.g. adhesively bonded, etc.) at opposing axial ends of the filter medium. The upper and lower trays 67b, 67c can be formed from a material different from that of the filter medium, such as plastic, metal, carboard, etc.

A preferred medium for the filter element K comprises polytetrafluoroethylene (PTFE) a polymeric, plastic material commonly referred to by the registered trademark TEFLON®. The low coefficient of friction of a filter medium comprising the PTFE facilitates cleaning of the filter element by washing. Most preferably, the pleated filter medium is defined substantially or entirely from GORE-TEX®, a PTFE-based material commercially available from W. L. GORE & ASSOCIATES, Elkton, Md. 21921. The preferred GORE-TEX® filter medium, also sold under the trademark CLEANSTREAM® by W. L. GORE & ASSOCIATES, is an expanded PTFE membrane defined from billions of continuous, tiny fibrils. The filter blocks the passage of at least 99% of particles 0.3 μm in size or larger. Although not visible in the drawings, the inwardly and/or outwardly facing surface of the CLEANSTREAM® filter membrane is preferably coated with a mesh backing material of plastic or the like for durability since it enhances the abrasion-resistance characteristics of the plastic filter material. The mesh may also enhance the strength of the plastic filter material somewhat.

Alternatively, the filter element K comprises POREX® brand, high-density polyethylene-based, open-celled, porous media available commercially from Porex Technologies Corp. of Fairburn, Ga. 30212, or an equivalent foraminous filter media. This preferred filter media is a rigid open-celled foam that is moldable, machinable, and otherwise workable into any shape as deemed advantageous for a particular application. The preferred filter media has an average pore size-in the range of 45 μm to 90 μm. It can have a substantially cylindrical configuration as is illustrated in FIG. 3, or any other suitable desired configuration. The filter element could also have a convoluted outer surface to provide a larger filtering area. Some filtration is also performed by the dirt L that has accumulated in the bottom end of the dirt cup as shown by the arrow M.

The dust and dirt cup or container 44 has a substantially closed lower end 68 having a centrally positioned aperture 70 that defines an outlet of the chamber 42. In the embodiment being described, the aperture 70 is *defined by a stem 69 comprising a first wall portion 69a and a second wall portion 69b. The stem 69 substantially surrounds aperture 70. Second wall portion 69b is shown as having a smaller diameter than first wall portion 69a. The first portion 69a is shown protruding from a raised area or pedestal 73 defined in the lower end or base wall 68. Stem 69 is shown extending in substantial alignment with an axis of the container 44. Lower tray 67c of filter element K engages stem 69 such that at least a portion of stem 69 extends along and is* located within the filter cage 66 *supporting filter element K on container 44 within chamber 42. An inside wall 67d of lower tray 67c engages first wall portion 69a of stem 69*. The final filter assembly housing 40 is positioned beneath and supports the dirt cup 44. With reference again to FIG. 3, the housing 40 is mounted on a front panel 71 of the upright housing section B. An upper cover 72 of the final filter housing includes a raised circular shoulder that mutually conforms to and supports the bottom of the container 44. The cover 72 includes a central aperture 74 that permits the aperture 70 of the container 44 to communicate with the central suction duct 38 of the annular housing 40. A disk-type secondary filter 76 and an elastomer ring seal 78 can be positioned within the cover aperture 74. The disk-type filter can be formed from a conventional open-celled foam or sponge material. The filter 76 prevents dirt and debris from reaching the motor/fan assembly E in the event that the filter K fails in any manner. That is, should there be a leak in the filter K, the secondary filter 76 will prevent dirt from being drawn into the motor and fan assembly E.

The suction airstream is drawn through the secondary filter 76 and central suction duct 38 and into the inlet 32 of the fan/motor housing 34a, 34b, where the suction airstream cools the fan/motor assembly E prior to being discharged from the fan/motor housing 34a, 34b through the outlet 36 thereof. The exhaust air is discharged into an annular exhaust plenum or chamber 80 formed between the sidewall defining the central suction duct 38 and the final-stage exhaust filter 82.

The final-stage exhaust filter medium is preferably a high-efficiency particulate arrest (HEPA) filter element that is bent, folded, molded, or otherwise formed into a generally annular or arcuate C-shape. As such, those skilled in the art will recognize that even if the motor/fan assembly causes contaminants to be introduced into the suction airstream downstream from the main filter stage G, the final filter assembly F will remove the same such that only contaminant-free air is discharged into the atmosphere.

Thus, as is evident from FIGS. 4 and 5, the present invention provides a compact airflow pathway arrangement that i) provides a greater surface area for filtering the exhaust airstream that conventional, substantially rectangular or cartridge-type exhaust filters, and ii) eliminates a conventional, substantially rectangular or cartridge-type exhaust filter and housing arrangement that extend generally from an exterior side surface of the vacuum cleaner upright housing section.

With reference to the present invention, dirty air flows into the inlet 50 and thus into the cyclonic chamber 42 defined within the dirt cup 44. As illustrated by the arrows 84 (FIG. 5) the airflow into the chamber 42 is tangential due to the diverter 54. This causes a vortex-type flow as is illustrated by arrows 86 (FIG. 4). Such vortex flow is directed downwardly in the dust chamber 42 since the top end thereof is blocked by the lid 58. The airflows radially inwardly and through the main filter K. The air then flows axially downward through the hollow interior of the filter K as illustrated by arrow 88 (FIG. 4). Subsequently, the air flows downward through the optional secondary disk-type filter 76 and the exhaust filter housing central duct 38. Thereafter, suction airstream enters the suction inlet 32 of the motor/fan housing 34a, 34b and then flows laterally across the suction inlet duct 33 of the housing as shown by arrow 90. The airstream is then drawn downward through the fan inlet duct 35 and forced (i.e. drawn and then exhausted) laterally across the motor/fan assembly E, as shown by arrows 91a, 91b, before flowing upward through the exhaust outlet duct 37 and through the arcuate, semi-circular or crescent-shaped exhaust outlet 36, and into the annular plenum 80 of the exhaust filter housing 40, as shown by arrow 92. Thereafter, the exhausted airstream then flows laterally or radially outward from the plenum 80 and through the exhaust filter 82. This is illustrated schematically by the arrows 94 in FIG. 4.

Those skilled in the art will certainly recognize that the term "cyclonic" as used herein is not meant to be limited to a particular direction of airflow rotation. This cyclonic action separates a substantial portion of the entrained dust and dirt from the suction airstream and causes the dust and dirt to be deposited in the dirt cup or container 44.

The main filter element K can be cleaned by simply rinsing it off. Alternatively, if the main filter element K is made from POREX® material, it can be washed either manually or in a dishwater—since it is dishwasher-safe—to remove dust or dirt particles adhering to the filter element. The secondary filter 76 can be cleaned by manual washing. It is, however, important that the primary and secondary filters be dried before they are used again. The final filter media of the filter assembly F, however, cannot be cleaned and must be replaced when it becomes clogged.

The invention has been described with reference to the preferred embodiments. Obviously, modifications and alterations will occur to others upon reading and understanding the preceding detailed description. It is integrated that the invention be construed as including all such modifications and alterations insofar as they come within the scope of the appended claims or the equivalents thereof.

Having thus described the preferred embodiments, the invention is now claimed to be:

1. A vacuum cleaner comprising:

a cyclonic airflow chamber that facilitates the separation of contaminants from a suction airstream, said airflow chamber including a chamber inlet and a chamber outlet, said chamber inlet being fluidically connected with a suction nozzle;

an exhaust filter housing including a suction airstream duct extending through the exhaust filter housing and an exhaust airstream plenum, said suction airstream duct communicating with said chamber outlet;

an airstream suction source including a suction inlet and a suction outlet, said suction inlet communicating with said suction airstream duct, and said suction outlet communicating with said exhaust airstream plenum; and a primary filter assembly mounted in said cyclonic airflow chamber upstream from said suction source for filtering contaminants from said suction airstream.

2. The vacuum cleaner as set forth in claim 1 wherein said primary filter assembly includes a filter element with a polytetrafluoroethylene (PTFE) filter medium.

3. The vacuum cleaner as set forth in claim 1 wherein said chamber inlet directs said suction airstream generally radially inward from an outer periphery of said cyclonic airflow chamber, and said chamber inlet includes a diverter at least partially positioned within said airflow chamber that directs said suction airstream along a tangential course within said chamber.

4. The vacuum cleaner as set forth in claim 1 further comprising an exhaust filter positioned within said exhaust filter housing, said exhaust filter being positioned radially outward of said exhaust filter housing plenum whereby exhaust air from said suction source is passed radially outward through said exhaust filter from said platform.

5. The vacuum cleaner as set forth in claim 4 wherein said exhaust filter comprises a filter efficiency particulate arrest (HEPA) filter medium.

6. The vacuum cleaner as set forth in claim 4 wherein said exhaust filter housing is cylindrical in shape and is positioned below said cyclonic airflow chamber.

7. The vacuum cleaner as set forth in claim 1 wherein said suction airstream duct extends centrally through said exhaust filter housing, and said exhaust filter housing plenum defines an annular chamber surrounding said suction airstream duct.

8. The vacuum cleaner as set forth in claim 1 wherein said cyclonic airflow chamber is defined by a dirt container that retains debris separated from said suction airstream, and a cover removably secured to said dirt container, said cover including a latch mechanism for removably securing said dirt container to the vacuum cleaner.

9. An upright vacuum cleaner comprising:

an upright housing section including a handle;

a nozzle base section hingedly interconnected with the upright housing section, said nozzle base section including a main suction opening formed in an underside thereof;

a cyclonic airflow chamber defined in said upright housing section for separating dust and dirt from a suction airstream, said cyclonic airflow chamber including a chamber inlet and a chamber outlet;

a suction source located in one of said upright housing section and said nozzle base section and having a suction airflow inlet and an exhaust airflow outlet;

an exhaust filter housing positioned adjacent said cyclonic airflow chamber and defining a space adapted for receipt of an associated exhaust filter, said space fluidically connected to and locate downstream from said exhaust airflow outlet of said suction source, said exhaust filter housing further comprising a suction airstream duct adjacent said space and in fluid communication with and fluidly interconnecting said chamber outlet and said suction airflow inlet; and a main filter assembly located between said cyclonic airflow chamber and said suction source for filtering residual dust and dirt from a suction airstream as it flows through said cyclonic airflow chamber.

10. The upright vacuum cleaner as set forth in claim 9 wherein said exhaust filter housing further includes an exhaust filter located in said space and positioned so as to be spaced from said suction airstream duct to define an exhaust plenum between said exhaust filter and said suction airstream duct, said exhaust plenum being in fluid communication with said exhaust filter airflow outlet.

11. The upright vacuum cleaner as set forth in claim 10 wherein said exhaust filter includes a high-efficiency particulate arrest (HEPA) filter medium.

12. The upright vacuum cleaner as set forth in claim 9 wherein said main filter assembly includes a polytetrafluoroethylene (PTFE) filter medium.

13. The upright vacuum cleaner as set forth in claim 9 wherein:

said chamber inlet directs said suction airstream generally radially inward from an outer periphery of said cyclonic airflow chamber; and said chamber inlet includes a driver at least partially positioned within said chamber that directs said suction airstream along a tangential course within said chamber.

14. The vacuum cleaner as set forth in claim 9 wherein said exhaust filter housing is cylindrical in shapes and said suction airstream duct extends centrally through said exhaust filter housing.

15. The vacuum cleaner as set forth in claim 9 wherein said cyclonic airflow chamber is defined by a dirt container that retains debris separated from said suction airstream, and a cover removably secured to said dirt container, said cover including a latch mechanism for removably securing said dirt container to the vacuum cleaner.

16. The upright vacuum cleaner as set forth in claim 9 further comprising a removable dirt cup, wherein said cyclonic airflow chamber is defined within said dirt cup between an interior wall thereof and an exterior wall of said main filter assembly.

17. The upright vacuum cleaner as set forth in claim 16 wherein said chamber inlet is located on a periphery of said dirt cup and said chamber outlet is located along a longitudinal axis of said dirt cup.

18. The upright vacuum cleaner as set forth in claim 9 further comprising a secondary filter positioned within said suction airstream duct.

19. The upright vacuum cleaner as set forth in claim 9 further comprising a secondary filter disposed between said chamber outlet and said suction airflow inlet.

20. The upright vacuum cleaner as set forth in claim 9, wherein said chamber inlet communicates with a suction duct formed integral with the upright housing section.

21. An upright vacuum cleaner including:

a separation chamber that facilitates the separation of debris from a suction airstream;

an exhaust filter housing including an exhaust filter;

a suction source housing including a suction source;

said separation chamber, said exhaust filter housing, and said suction source housing cooperating to define an airflow pathway that i) extends axially downward from said separation chamber through said exhaust filter housing and into said suction source housing, ii) extends laterally across said suction source; iii) extends axially upward from said suction source housing into said exhaust filter housing, and iv) extends radially outward through said exhaust filter.

*22. A vacuum cleaner comprising:*

*a base unit;*

*a housing pivotally mounted on said base unit;*

*a suction source mounted to one of said base unit and said housing;*

*a dirt receptacle mounted to said housing, said dirt receptacle comprising a base wall, a side wall and an open upper end;*

*a stem protruding from said base wall;*

*a filter removably mounted on said stem; and,*

*a lid selectively covering said open upper end of said dirt receptacle.*

*23. The vacuum cleaner of claim 22 wherein said stem is centrally located on said base wall.*

*24. The vacuum cleaner of claim 22 wherein said stem surrounds an opening extending through said base wall.*

*25. The vacuum cleaner of claim 24 wherein said filter comprises a lower tray engaging said stem.*

*26. The vacuum cleaner of claim 22 wherein said filter comprises an upper tray.*

*27. The vacuum cleaner of claim 22 wherein said filter comprises a pleated filter medium.*

*28. The vacuum cleaner of claim 22 further comprising a frame for supporting said filter.*

*29. The vacuum cleaner of claim 22 wherein said stem is of one piece with said dirt receptacle.*

*30. The vacuum cleaner of claim 22 wherein said stem extends in substantial alignment with said side wall of said dirt receptacle.*

*31. The vacuum cleaner of claim 22 further comprising a raised area located on said dirt receptacle base wall.*

*32. The vacuum cleaner of claim 31 wherein said stem protrudes from said raised area.*

*33. The vacuum cleaner of claim 22 wherein said filter is approximately cylindrical in shape.*

*34. A vacuum cleaner comprising:*

*a nozzle base comprising a suction inlet;*

*a housing pivotally mounted on said nozzle base;*

*a suction source mounted to one of said nozzle base and said housing, said suction inlet communicating with said suction source;*

*a dirt receptacle mounted to said housing, said dirt receptacle comprising a base wall, a side wall and an open upper end;*

*a stem protruding from said base wall;*

*a filter assembly removably mounted on said stem, said filter assembly comprising a first filter element.*

*35. The vacuum cleaner of claim 34 further comprising a second filter element, spaced from said first filter element.*

*36. The vacuum cleaner of claim 35 wherein at least one of said first and second filter elements comprises a high efficiency particulate arrest filter material.*

*37. The vacuum cleaner of claim 34 wherein said stem is centrally located on said base wall.*

*38. The vacuum cleaner of claim 34 wherein said stem surrounds an opening extending through said base wall.*

*39. The vacuum cleaner of claim 38 wherein said filter assembly comprises a lower tray engaging said stem.*

*40. The vacuum cleaner of claim 34 wherein said filter assembly comprises a closed upper end.*

*41. The vacuum cleaner of claim 40 wherein said upper end comprises an upper tray.*

*42. The vacuum cleaner of claim 34 wherein said first filter comprises a pleated filter medium.*

*43. The vacuum cleaner of claim 34 wherein said filter assembly further comprises a frame for supporting said first filter element.*

*44. The vacuum cleaner of claim 34 wherein said stem is of one piece with said dirt receptacle.*

*45. The vacuum cleaner of claim 34 wherein said stem extends in substantial alignment with said side wall of said dirt receptacle.*

*46. The vacuum cleaner of claim 34 further comprising a raised area located on said dirt receptacle base wall.*

*47. The vacuum cleaner of claim 46 wherein said stem protrudes from said raised area.*

*48. The vacuum cleaner of claim 34 wherein said filter assembly is approximately cylindrical in shape.*

*49. A vacuum cleaner comprising:*

*a base unit, including a nozzle opening;*

*a housing pivotally mounted on said base unit;*

*a dirt receptacle mounted to said housing, said dirt receptacle comprising a base wall, a side wall and an open upper end, said dirt receptacle comprising a filtration chamber;*

*a filter removably mounted on said filtration chamber;*

*a tangential inlet to said filtration chamber;*

*an outlet from said filtration chamber, said outlet being located on said dirt receptacle base wall and comprising a stem protruding from said dirt receptacle base wall; and,*

*a suction source mounted to one of said base unit and said housing and communicating with said outlet from said filtration chamber.*

*50. The vacuum cleaner of claim 49 wherein said stem is centrally located on said base wall.*

*51. The vacuum cleaner of claim 49 wherein said filter comprises a lower tray engaging said stem.*

*52. The vacuum cleaner of claim 49 wherein said filter comprises a closed upper end.*

*53. The vacuum cleaner of claim 52 wherein said upper end comprises an upper tray.*

*54. The vacuum cleaner of claim 49 wherein said filter comprises a pleated filter medium.*

*55. The vacuum cleaner of claim 54 wherein said pleated filter medium comprises a thermoplastic material.*

*56. The vacuum cleaner of claim 55 further comprising a first end portion on a first end of said filter and a second end portion on a second end of said filter, wherein said first and second end portions comprise a different material than said thermoplastic material of said filter medium.*

*57. The vacuum cleaner of claim 49 further comprising a frame for supporting said filter.*

*58. The vacuum cleaner of claim 49 wherein said stem is of one piece with said dirt receptacle.*

*59. The vacuum cleaner of claim 49 wherein said stem extends in substantial alignment with said side wall of said dirt receptacle.*

*60. The vacuum cleaner of claim 49 wherein said suction source is positioned approximately beneath said filtration chamber.*

*61. A vacuum cleaner comprising:*

*a base unit, including a nozzle opening;*

*a housing pivotally mounted on said base unit;*

*a dirt receptacle mounted to said housing, said dirt receptacle comprising a base wall, a side wall and an open upper end, said dirt receptacle comprising a filtration chamber;*

*a suction source mounted to one of said base unit and said housing and communicating with said nozzle opening via said filtration chamber;*

*a tangential inlet to said filtration chamber;*

*an axial outlet from said filtration chamber, said outlet being located on said dirt receptacle base wall and comprising a stem; and,*

*a filter removably mounted on said stem.*

*62. The vacuum cleaner of claim 61 wherein said filter is spaced from said base wall of said dirt receptacle.*

*63. The vacuum cleaner of claim 61 wherein said stem extends along an axis of said dirt receptacle.*

*64. The vacuum cleaner of claim 61 wherein said axial outlet from said filtration chamber communicates with an inlet of said suction source.*

*65. The vacuum cleaner of claim 61 wherein said filter comprises a closed upper end.*

*66. The vacuum cleaner of claim 65 wherein said upper end comprises an upper tray.*

*67. The vacuum cleaner of claim 61 wherein said filter comprises a pleated filter medium.*

*68. The vacuum cleaner of claim 61 further comprising a frame for supporting said filter.*

*69. The vacuum cleaner of claim 61 wherein said stem is of one piece with said dirt receptacle.*

*70. The vacuum cleaner of claim 61 wherein said stem extends in substantial alignment with said side wall of said dirt electrode.*

*71. The vacuum cleaner of claim 61 further comprising a raised area located on said dirt receptacle base wall.*

*72. The vacuum cleaner of claim 71 wherein said stem is positioned on said raised area.*

* * * * *